United States Patent

Spry

[15] 3,691,188
[45] Sept. 12, 1972

[54] METHOD FOR PREPARING PENICILLIN SULFOXIDES

[72] Inventor: Douglas O. Spry, Indianapolis, Ind. 46260

[73] Assignee: Eli Lilly and Company, Indianapolis, Ind.

[22] Filed: Aug. 10, 1970

[21] Appl. No.: 62,717

[52] U.S. Cl..............................260/306.7, 260/239.1
[51] Int. Cl. ................................................C07d 99/16
[58] Field of Search..........................260/239.1, 306.7

[56] References Cited

UNITED STATES PATENTS 3,544,581  12/1970  Essery....................260/243 C

Primary Examiner—Nicholas S. Rizzo
Attorney—Everet F. Smith and Walter E. Buting

[57] ABSTRACT

6-Aminopenicillanic acid, 6-acylaminopenicillanic acids, 2-alkanoyloxymethyl-2-methyl-6-acylaminopenam-3-carboxylic acids and the esters thereof are oxidized to the corresponding penicillin sulfoxides in inert solvents with ozone at a temperature between about −10° and 35° C. The penicillin sulfoxides obtained thereby are useful for conversion to cephalosporin antibiotics.

7 Claims, No Drawings

METHOD FOR PREPARING PENICILLIN SULFOXIDES

BACKGROUND OF THE INVENTION

The chemical conversion of penicillin antibiotics to cephalosporin antibiotics has been known for some time. (R. B. Morin et al. *J. Am. Chem. Soc.*, 85, 1896 (1963), U.S. Pat. No. 3,275,626.)

According to the art-recognized procedure, a 6-acylaminopenicillanic acid ester sulfoxide or a 2-acyloxymethyl-2-methyl-6-acylaminopenicillanic acid ester sulfoxide is heated under acid conditions to effect conversion to the cephalosporin compound.

The starting materials in the conversion reaction, penicillin sulfoxides, have been prepared with a variety of oxidizing agents. For example, the organic peracids such as peracetic acid, perbenzoic acid and m-chloroperbenzoic acid and the inorganic oxidants, such as hydrogen peroxide and sodium periodate have been employed with varying degrees of success.

It is an object of this invention to provide a novel method for preparing penicillin sulfoxides which provides the desired penicillin sulfoxides in excellent yields substantially free of over-oxidation products.

SUMMARY

This invention relates to a method for preparing penicillin sulfoxides. In particular this invention relates to a method for oxidizing the sulfur atom of the thiazolidine ring of the penicillin nucleus with ozone to form the sulfoxide.

The nomenclature employed herein for the penicillins follows the penam system of nomenclature described by Sheehan, Henery-Logan, and Johnson, J. Am Chem. Soc., 75, 3293, footnote 2 (1953). In accordance with this system of nomenclature, "penam" refers to the following structure:

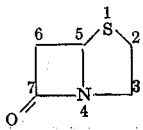

and "penicillanic acid" refers to the 2,2-dimethyl-penam-3-carboxylic acid of the following formula:

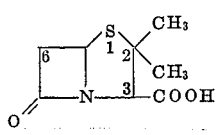

Likewise, the nomenclature used in this description follows the cepham nomenclature according to which "-cepham" refers to the following structure

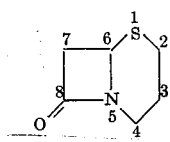

According to the novel method of this invention, a penicillanic acid or ester thereof is reacted with ozone in an inert solvent at a temperature between about −10° and 35° C. to afford the corresponding penicillanic acid or ester sulfoxide. The method is useful for the preparation of a variety of penicillin sulfoxides. For example, 6-aminopenicillanic acid, 6-acylamidopenicillanic acids, 2-alkanoxyloxymethyl-2-methyl-6-acylamidopenam-3-carboxylic acids and the esters thereof formed with non-oxidizable groups, such as the benzyl, p-nitrobenzyl, benzhydryl, t-butyl and trichloroethyl esters, react with ozone to form the corresponding acid or ester sulfoxides.

The appropriate penicillanic acid or ester is dissolved or suspended in an inert solvent or solvent mixture, such as a mixture of water and acetone, and the solution is ozonized at a temperature between about −10° and 35° C., preferably at −5° to 5° C. The ozone is generated by the action of an electric discharge on a stream of oxygen according to presently known methods. The penicillin sulfoxide is recovered from the reaction mixture by evaporation of the organic solvent, or lyophilization in the case where water is employed as the inert solvent. The penicillin sulfoxides so prepared can be further purified by recrystallization or by absorption chromatography over a suitable adsorbent, such as silica gel.

The novel method of the present invention affords penicillin sulfoxides in high yields and in a substantially pure state free of over-oxidation products such as the sulfones.

The penicillin sulfoxides provided by this invention are useful for the preparation of cephalosporin antibiotics by known procedures.

DETAILED DESCRIPTION

The method of the present invention which comprises the facile oxidation with ozone of 6-aminopenicillanic acid, 6-acylamindopenicillanic acids, 2-alkanoyloxymethyl-2-methyl-6-acylamindopenam-3-carboxylic acids and the esters thereof formed with non-oxidizable groups, can be represented by the following general equation:

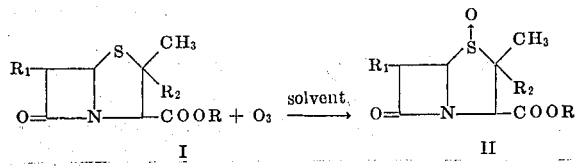

wherein R is hydrogen, a unit negative charge or a non-oxidizable ester forming group, $R_2$ is methyl or $C_2$–$C_5$ alkanoyloxymethyl, $R_1$ is $NH_3^+$ or protected amino, phthalimido or an acylamido group represented by the formula

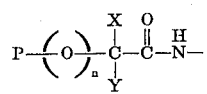

wherein X is hydrogen, methyl or ethyl, Y is hydrogen, methyl, hydroxy, $NH_3^+$ or protected amino, P is phenyl, substituted phenyl or $C_1$–$C_5$ alkyl, $n$ is 0 or 1, and when $n$ is 1, P is phenyl or substituted phenyl and Y is hydrogen or methyl and when $n$ is 0 and Y is hydrogen, hydroxy, $NH_3^+$ or protected amino, X is hydrogen with the limitation that when the $R_1$ substituent does not include an $NH_3^+$ group, then R is hydrogen or a non-oxidizable ester forming group.

The term "non-oxidizable ester forming group" refers to ester forming groups which are commonly employed as carboxylic acid protecting groups and which are unreactive with ozone under the conditions described herein. ILlustrative of such groups are benzyl, benzhydryl, p-nitrobenzyl, 2,2,2-trichloroethyl, t-butyl, methyl and the like.

The term "protected amino" group refers to a substituted amino group wherein the substituent group is one commonly employed for the protection of the basic amino function such as those groups which form urethanes with the protected amino group. Illustrative of such groups are benzyloxycarbonyl, p-nitrobenzyloxycarbonyl, p-methoxybenzyloxycarbonyl, t-butyloxycarbonyl, t-amyloxycarbonyl, 2-(p-diphenyl)-isopropyloxycarbonyl, adamantyloxycarbonyl and the like. The term also has reference to other amino protecting groups such as acetyl, chloroacetyl, benzoyl and the like.

The term "$C_1$–$C_5$ alkyl" refers to the straight or branched chain aliphatic hydrocarbon radicals such as methyl, ethyl, n-propyl, isopropyl, n-butyl, iso-butyl, n-amyl, sec-amyl and the like. Substituted phenyl refers to a mono, di- or tri-substituted phenyl ring represented by the formula

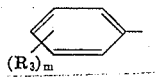

wherein $R_3$ is $C_1$–$C_4$ alkyl, $C_1$–$C_4$ alkoxy, halogen, hydroxy, nitro or $NH_3^+$ or protected amino and $m$ is 1 or 2.

The term "$C_1$–$C_4$ alkyl" refers to methyl, ethyl, n-propyl, n-butyl, iso-butyl and the like. "$C_1$–$C_4$ alkoxy" refers to methoxy, ethoxy, n-propoxy, isopropoxy n-butyoxy, sec-butoxy and the like. Halogen refers to fluoro, chloro and bromo.

The term "$C_2$–$C_5$ alkanoyloxymethyl" refers to acetoxymethyl, propionyloxymethyl, n-butyryloxymethyl, isobutyryloxymethyl, n-valeryloxymethyl and the like.

Examples of groups representative of $R_1$, when in the above Formula I, $R_1$ is an acylamido group, include acetamido, propionamido, butyrylamido, phenylacetamido, phenoxyacetamido, 2,6-dimethoxyphenylacetamido, α-methylphenoxyacetamido, αα-dimethylphenoxyacetamido, 4!-nitrophenylacetamido, 3,4-dichlorophenylacetamido, 3-hydroxyphenylacetamido, 4-ethylphenylacetamido, 4butyloxycarbamidophenylacetamido, α-(benzyloxycarbamido)phenylacetamido, 4-methoxyphenylacetamido, α-hydroxyphenylacetamido, 4-chlorophenoxyacetamido, 2-bromophenoxyacetamido, 4-isopropoxyphenylacetamido, α-ethyl-α-methylphenoxyacetamido, 3,4-dimethylphenoxyacetamido, 4-fluorophenylacetamido and like acylamido groups.

According to the present method the pencillanic acid or ester thereof represented by the Formula I is dissolved or suspended in an inert solvent and ozone gas is allowed to pass through the solution or suspension. The temperature of the reaction mixture is maintained between about −10° and 35° C. and preferably between about 5° to 10° C. Cooling to the desired temperature is accomplished by surrounding the reaction vessel with a suitable coolant such as an ice-water mixture or an ice-salt mixture. Inert solvents are those which are unreactive with ozone and the starting material. Representative of the inert solvents which can be employed in the present invention are water, water in combination with low molecular weight ketones and alcohols such as acetone, methanol and ethanol, the chlorinated hydrocarbons such as methylene chloride, ethylene dichloride and chloroform, and esters such as ethyl acetate and isopropyl acetate. A preferred inert solvent is a 1:1 mixture of acetone-water. The inert solvent or inert solvent mixture is desirably one in which the penicillanic acid or ester is at least partially soluble over the temperature range described above. Those skilled in the art will recognize that other inert solvents and mixtures thereof can be employed in the practice of the present method in preparing particular penicillanic acid or ester sulfoxides.

The ozone gas is conveniently prepared in an ozone generator of the type commonly employed in synthetic and analytical chemical work to produce ozone by the action of an electric discharge on oxygen. The ozone is generated in a stream of oxygen which is then passed directly into the reaction vessel. The percentage of ozone produced in the generator is variable, depending on the rate of flow of oxygen as well as the intensity of the electric discharge selected. For convenience, the percentage of ozone generated with any given flow setting for oxygen can be determined iodometrically by titrating with sodium thiosulfate the amount of iodine liberated from a standard solution of potassium iodide by ozone from the generator. In this manner, the amount of ozone passing through the reaction mixture with time can be calculated. However, one advantage of the present method for preparing penicillin sulfoxides is that ozone can be used in excess without producing over-oxidation. Therefore, the amount of ozone is not critical, provided that a sufficient amount is supplied to the reaction mixture to provide complete oxidation of the penicillin to the penicillin sulfoxide. In general, an excess amount of ozone is passed through the cooled reaction mixture to insure complete reaction. The time required for complete oxidation varies with the percentage of ozone generated in the oxygen stream.

The penicillin sulfoxide products are recovered from the reaction mixture and purified by evaporating the reaction solvent and crystallizing the solid products obtained. One of the desirable features of the present process is that it provides substantially pure penicillin sulfoxides and thus obviates extensive purification procedures required with other methods of oxidation wherein either incompletely oxidized or over-oxidized contaminants occur in the reaction product mixture.

Those skilled in the art will recognize that two isomeric penicillin sulfoxides are possible, as illustrated by the following formulae:

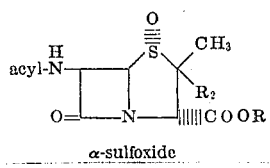
α-sulfoxide

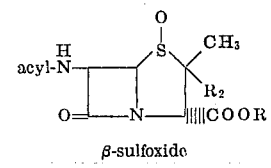
β-sulfoxide wherein R is hydrogen or an ester forming group.

According to the practice of this invention, the oxidation with ozone of a compound of the Formula I, wherein $R_1$ is acylamido or $NH_3^+$, affords a mixture of the isomeric 6-acylamidopenicillanic acid sulfoxides or 6-aminopenicillanic acid sulfoxides. For example, 6-phenoxyacetamidopenicillanic acid affords approximately a 1:1 ratio of the α- and β-sulfoxides.

When $R_1$ of Formula I is phthalimido, oxidation with ozone according to the present method provides 6-phthalimidopenicillanic acid α-sulfoxide as the predominant product.

The amount of each isomeric penicillin sulfoxide present in the isolated product can be determined from the nuclear magnetic resonance spectrum of the product.

In a preferred embodiment of the present invention, 6-phenoxyacetamidopenicillanic acid (phenoxymethylpenicillin) is dissolved in water-acetone (1:1, v:v) and the solution is cooled to a temperature of about 0° to 5° C. in an ice-salt mixture. A stream of ozone-containing oxygen is passed through the cold solution until an excess of ozone has been passed into the reaction mixture. The reaction mixture is then evaporated to remove the acetone and the white solid precipitate is filtered to yield 6-phenoxyacetamidopenicillanic acid β-sulfoxide. The aqueous filtrate is lyophilized to yield 6-phenoxyacetamidopenicillanic acid α-sulfoxide.

In another embodiment of the present invention, a slurry of 6-aminopenicillanic acid (6–APA) in water is maintained at a temperature of about 5° C. while a stream of ozone-containing oxygen in excess is passed through the cold suspension. A colorless clear solution results. The solution is lyophilized to yield a nearly quantitative yield of 6–APA sulfoxide.

Previously known methods for the oxidation of 6–APA to 6–APA sulfoxide afford low yields of product. For example, the oxidation of 6–APA with sodium periodate is reported to yield only 8 percent of 6–APA sulfoxide. *J. Org. Chem.*, 30, (12), 4388–9 (1965).

The following compounds are illustrative of the penicillanic acid and ester sulfoxides which can be prepared by the practice of the present invention:

6-aminopenicillanic acid α-sulfoxide,
p-nitrobenzyl 6-aminopenicillanate α-sulfoxide,
6-phthalimidopenicillanic acid α-sulfoxide
p-nitrobenzyl 6-phthalimidopenicillanate α-sulfoxide,
6-acetamidopenicillanic acid β-sulfoxide,
2,2,2-trichloroethyl 6-acetamidopenicillanate β-sulfoxide,
p-nitrobenzyl 6-acetamidopenicillanate β-sulfoxide,
6-phenylacetamidopenicillanic acid α and β-sulfoxides,
p-nitrobenzyl 6-phenylacetamidopenicillanate α and β-sulfoxides,
6-phenoxyacetamidopenicillanic acid α and β-sulfoxides,
benzyl 6-phenoxyacetamidopenicillanate α and β-sulfoxides,
p-nitrobenzyl 6-phenoxyacetamidopenicillanate α and β-sulfoxides,
2,2,2-trichloroethyl 6-phenoxyacetamidopenicillanate α and β-sulfoxides,
6-[2'-(4-nitrophenyl)acetamido]penicillanic acid α and β-sulfoxides,
2-β-acetoxymethyl-2-α-methyl-6-phthalimidopenicillanic acid α-sulfoxide,
2-β-propionoxymethyl-2-α-methyl6-phthalimidopenicillanic acid α-sulfoxide,
6-(2',2'-dimethyl-2'-phenoxyacetamido) penicillanic acid α and β-sulfoxides,
2-β-acetoxymethyl-2-α-methyl-6-acetamidopenicillanic acid β-sulfoxide,
2-β-butyryloxy-2-α-methyl-6-acetamidopenicillanic acid β-sulfoxide,
2,2,2-trichloroethyl 2-β-acetoxymethyl-2-α-methyl-6-phenoxyacetamidopenicillanate α and 62 -sulfoxides,
benzhydryl 6-phenoxyacetamidopenicillanate α and β-sulfoxides,
6-(2'-hydroxy-2'-phenylacetamido)penicillanic acid α and β-sulfoxides,
6-(2,6-dimethoxyphenylacetamido)penicillanic acid α and β-sulfoxides,
6-(4-methylphenoxyacetamido)penicillanic acid α and β-sulfoxides,
6-(3-chlorophenylacetamido)penicillanic acid α and β-sulfoxides,
6-(2'-hydroxy-2'-m-hydroxyphenylacetamido)penicillanic acid α and β-sulfoxides,
6-(2'-amino-2'-phenylacetamido)penicillanic acid α and βsulfoxides,
6-n-hexanoylaminopenicillanic acid β-sulfoxide,
6-(3,4-dichlorophenylacetamido)penicillanic acid α and β-sulfoxides and like penicillanic acid sulfoxides.

The 6-acylamidopenicillanic acid sulfoxides provided by this invention are useful for the preparation of antibiotics of the cephalosporin class according to the method described in U.S. Pat. No. 3,275,626. Accordingly, a 6-acylamidopenicillanic acid, for example 6-phenoxyacetamidopenicillanic, is oxidized to the sulfoxide with ozone according to the practice of this invention and esterified with a suitable ester forming compound, for example, 2,2,2-trichloroethanol. The ester is reacted under the conditions described in U.S. Pat. No. 3,275,626 to provide a 3-methyl-7-acylamino-$\Delta^3$-cephem-4-carboxylic acid ester, for example, 2,2,2-trichloroethyl 3-methyl17-phenoxyacetamido-$\Delta^3$-cephem-4-carboxylate. Likewise, a 2-alkanoyloxymethyl-2-methyl-6-acylaminopenicillanic acid, in particular a 2-alkanoyloxymethyl-2-methyl-6-phthalimidopenicillanic acid, for example, 2-acetoxymethyl12-methyl-6-phthalimidopenicillanic acid, is converted to the corresponding sulfoxide with ozone, the sulfoxide obtained thereby is esterified, and the sulfoxide ester is reacted under the conditions described in U.S. Pat. No. 3,275,626, to provide a 3-alkanoyloxymethyl-7-acylamino-$\Delta^3$-cephem-4-carboxylic acid ester, for example, p-nitrobenzyl 3-acetoxymethyl-7-phthalimido-$\Delta^3$-cephem-4-carboxylate.

Alternatively, a 6-acylamidopenicillanic acid ester or a 2-alkanoyloxymethyl-2-methyl-6-acylamidopenicillanic acid ester wherein the ester group is formed with a non-oxidizable moiety, for example, the p-nitrobenzyl or benzyl group, is oxidized with ozone according to the practice of this invention and the sulfoxide ester thereby obtained is converted to a 3-methyl-7-acylamino-$\Delta^3$-cephem-4-carboxylic acid ester or a 3-alkanoyloxymethyl-$\Delta^3$-cephem-4-carboxylic acid ester respectively.

6-Aminopenicillanic acid sulfoxide, provided by the oxidation with ozone as described herein, is likewise useful for the preparation of antibiotics of the cephalosporin class. For example, 6-aminopenicillanic acid sulfoxide is acylated according to well known procedures to provide a 6-acylaminopenicillanic acid sulfoxide which, on esterification, yeilds the corresponding 6-acylaminopenicillanic acid ester sulfoxide. The latter is then converted to a cephalosporin antibiotic compound as previously discussed.

The starting materials useful in the present process are known and described by the prior art and can be prepared by known methods. Thus, for example, 6-phthalimidopenicillanic acid is prepared by the method of Sheehan et al., *J. Am. Chem. Soc., 84*, 2983 (1962). The 6-acylamidopenicillanic acids are prepared by the acylation of 6–APA with an acyl halide in the presence of sodium carbonate according to well known procedures. Alternatively, they can be prepared by the well known mixed-anhydride method. The 2-alkanoyloxymethylpenicillins are prepared as described in U.S. Pat. No. 3,275,626.

The present invention provides a novel method for preparing highly pure penicillin sulfoxides in excellent yield.

The present invention thereby affords an improvement in the conversion process for converting penicillin antibiotics to cephalosporin antibiotics.

The process of the present invention is more fully illustrated by the following examples.

EXAMPLE 1

A suspension of 2.16 g. of 6-aminopenicillanic acid in 200 ml. of water was cooled in an ice bath and an oxygen stream containing ozone was passed through the cold suspension for 3 hours. The ozone was generated in a Wellsbach Ozonization apparatus at a rate of 3.4 g./hr. Complete solution was obtained after about 2.5 hours of gas flow. The colorless solution was lyophilized to obtain 2.26 g. of 6-aminopenicillanic acid sulfoxide as a pale yellow solid.

Elemental analysis:
Calculated: C, 41.38; H, 5.21; N, 12.07
Found: C, 41.10; H, 5.34; N, 12.27
N. M. R. ($D_2O$) 1.32 (S, 3, $\alpha$-methyl)

1.70 (S, 3, $\beta$-methyl)
4.53 (S, 1, $H_3$)
5.25 (d, J=4,1)   )
                  ) $H_5$ and $H_6$
5.40 (d, J=4,1)   )

Infrared Absorption Spectrum: 1787 cm.$^{-1}$ ($\beta$-lactam) (mull) 1025, 1007 (sulfoxide)

EXAMPLE 2

A solution of 3.5 g. of 6-phenoxyacetamidopenicillanic acid in 50 ml. of acetone and 50 ml. of water was cooled in a salt-ice mixture to a temperature of 0° C. and the solution was ozonized with stirring for 2.5 hours. During this time a large excess of ozone was passed through the cold solution. The reaction solution was then evaporated in vacuo at a temperature of 45° C. to remove the acetone. The solid white precipitate which formed during the removal of acetone was filtered and vacuum dried at 30° C. for 24 hours to yield 1.8 g. of 6-phenoxyacetamidopenicillanic acid $\beta$-sulfoxide. The aqueous filtrate was lyophilized to yield a pale yellow solid which, after drying at 30° C. for 24 hours, gave 1.8 g. of 6-phenoxyacetamidopenicillanic acid $\alpha$-sulfoxide.

Elemental analysis:

| $\beta$-sulfoxide | Theory: | C, 52.46; H, 4.95; N, 7.65 |
|---|---|---|
| | Found: | C, 52.30; H, 5.02; N, 7.64 |
| $\alpha$-sulfoxide | Theory: | C, 52.46; H, 4.95; N, 7.65 |
| | Found: | C, 52.25; H, 5.02; N, 7.48 |

Infrared absorption spectrum ($CHCl_3$) cm.$^{-1}$
$\beta$-sulfoxide: 1020, 1035, 1065, 1080 (sulfoxide)
1800 ($\beta$-lactam) and 1690 (amide)
$\alpha$-sulfoxide: 1796, 1730, 1700, 1080, 1065 and 1040.

Nuclear Magnetic Resonance Spectrum: $\delta$ (DMSO D6)

| $\beta$-sulfoxide | 1.22 (S, 3, $\alpha$-methyl) |
|---|---|
| | 1.62 (S, 3, $\beta$-methyl) |
| | 4.45 (S, 1, $H_3$) |
| | 4.65 (S, 2, $-CH_2-O-phenyl$) |
| | 5.95 (q J=4, J=10, $H_6$) |
| | 7.12 (M-Aromatic) |
| | 8.27 (d J=10, 1, NH) |
| $\alpha$-sulfoxide | 1.25 (S, 3, $\alpha$-methyl) |
| | 1.62 (S, 3, $\beta$-methyl) |
| | 4.35 (S, 1, $H_3$) |
| | 4.67 (S, 2, $-CH_2-O-phenyl$) |
| | 4.77 (d J=4, 1, $H_5$) |
| | 5.50 (q J=4, J=8, 1, $H_6$) |
| | 7.15 (M-Aromatic) |
| | 9.28 (d, J=8, 1, NH) |

EXAMPLE 3

A solution of 186 mg. of 6-phthalimidopenicillanic acid in 50 ml. of water and 5 ml. of acetone was cooled in an ice-salt mixture to a temperature of 0° C. The cold solution was then treated with an excess of ozone for about 1 hour. The acetone was removed from the reaction mixture by evaporation and the cloudy aqueous residue was lyophililized to obtain 195 mg. of 6-phthalimidopenicillanic acid $\alpha$-sulfoxide as white crystals.

Elemental analysis:
Theory: C, 53.04; H, 3.90; N, 7.73
Found: C, 52.77; H, 4.13; N, 7.73
Nuclear magnetic resonance spectrum: $\delta$ (DMSO D6)

1.25 (S, 3, $\alpha$-methyl)
1.68 (S, 3, $\beta$-methyl)
4.45 (S, 1, $H_3$)
4.90 (d J=4, 1, $H_5$)
6.08 (d, J=4, 1, $H_6$)
7.97 (S, 4, Aromatic)

EXAMPLE 4

A solution of one gram of 6-(2',2'-dimethyl-2'-phenoxyacetamidopenicillanic acid in 50 ml. of acetone and 50 ml. of water and the solution cooled to a temperature of −5° C. in an ice-salt mixture. The cold solution was ozonized for 1 hour and 15 minutes, during which time excess ozone was passed through the solution. The reaction mixture was lyophilized to yield 1.04 g. of solid colorless residue. Based on the N. M. R. spectrum, the residue was a mixture of the $\beta$-sulfoxide and the $\alpha$-sulfoxide in a ratio of 1.4/1. The infrared absorption spectrum of the product run as a mull in mineral oil showed the following principal absorption peaks: 1796, 1745, 1689, 1655, 1070, 1038 and 1020 cm.$^{-1}$.

EXAMPLE 5

When 6-(2'-ethyl-2'-phenoxyacetamidopenicillanic acid was ozonized according to the procedure described by Example 4, there was obtained a mixture of the β and α-sulfoxides, as evidenced by the N. M. R. spectrum of the dried reaction product.

EXAMPLE 6

A solution of 4 g. of 2,2,2-trichloroethyl 2-β-acetoxymethyl-2-α-methyl-6-phenoxyacetamidopenicillanate in 80 ml. of acetone and 45 ml. of water was cooled to a temperature of −10° C. The cold solution was ozonized with stirring until excess ozone had been passed through the solution. The reaction mixture was evaporated to dryness in vacuo and the solid residue was chromatographed over a column packed with silica gel. The column was eluted by the gradient elution technique with a benzene-ethyl acetate gradient. The eluant fractions which contained the same materials, as indicated by thin layer chromatography, were combined and evaporated to dryness to yield 430 mg. of 2,2,2-trichloroethyl 2-β-acetoxymethyl-2-α-methyl-6-phenoxyacetamidopenicillanate α-sulfoxide β-sulfoxide.

EXAMPLE 7

A solution of 0.16 g. of methyl 2β-acetoxymethyl-2 α-methyl-6-acetamidopenicillanate in 25 ml. of acetone and 25 ml. of water was cooled in an ice-salt mixture to a temperature of −3° C. and ozonized for 15 minutes at a rate of 1.18 mm. of $O_3$ per minute. The colorless solution was evaporated in vacuo at a temperature of 50° C. to yield 0.169 g. of a white foam. The reaction product mixture was chromatographed over silica gel using an ethyl acetate benzene mixture as the gradient to yield 30 mg. of methyl 2α-acetoxymethyl-2 α-methyl-6-acetamidopenicillanic acid ester β-sulfoxide and sulfoxide and 39 mg. of the α-sulfoxide.

I claim:

1. The method for preparing a penicillin sulfoxide of the formula

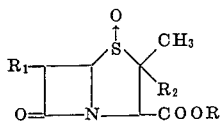

wherein R is hydrogen, a unit negative charge or a non-oxidizable ester forming group, $R_2$ is methyl or $C_2$–$C_5$ alkanoyloxymethyl, $R_1$ is $NH_3^+$, protected amino, phthalimido or an acylamido group of the formula

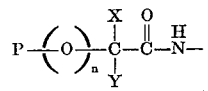

wherein X is hydrogen, methyl or ethyl, Y is hydrogen, methyl, hydroxy, $NH_3^+$ or protected amino, P is phenyl, substituted phenyl or $C_1$–$C_5$ alkyl, $n$ is 0 or 1, and when $n$ is 1, P is phenyl or substituted phenyl and Y is hydrogen or methyl and when $n$ is 0 and Y is hydrogen, hydroxy, $NH_3^+$ or protected amino, X is hydrogen, with the limitation that when the $R_1$ substitutent does not include an $NH_3^+$ group, then R is hydrogen or a non-oxidizable ester forming group which comprises the oxidation with ozone in an inert solvent at a temperature between −10° and 35° C. of a penicillin compound of the formula

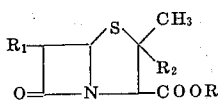

wherein R, $R_1$ and $R_2$ have the same meanings as defined above.

2. The method of claim 1 wherein the starting penicillin compound is 6-aminopenicillanic acid and the inert solvent is water.

3. The method of claim 1 wherein $R_1$ is an acylamido group.

4. The method of claim 3 wherein the starting penicillin compound is 6-phenoxyacetamidopenicillanic acid.

5. The method of claim 3 wherein the starting penicillin compound is p-nitrobenzyl 6-phenoxyacetamidopenicillanate.

6. The method of claim 3 wherein the starting penicillin compound is 2,2,2-trichloroethyl 6-phenoxyacetamidopenicillanate.

7. The method of claim 3 wherein the starting penicillin compound is 6-acetamidopenicillanic acid.

* * * * *